United States Patent
Cheong et al.

(10) Patent No.: US 6,917,480 B2
(45) Date of Patent: Jul. 12, 2005

(54) APPARATUS TO DRIVE OBJECTIVE LENS OF AN OPTICAL PICKUP

(75) Inventors: Young-min Cheong, Seoul (KR); Jin-won Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 18 days.

(21) Appl. No.: 10/289,302

(22) Filed: Nov. 7, 2002

(65) Prior Publication Data

US 2003/0206355 A1 Nov. 6, 2003

(30) Foreign Application Priority Data

May 1, 2002 (KR) .......................... 2002-23944

(51) Int. Cl.[7] .............................................. G02B 7/02
(52) U.S. Cl. ...................... 359/814; 359/822; 359/823; 359/819; 359/813
(58) Field of Search ................... 359/814, 819, 359/822, 824, 813, 823; 369/44.12, 44.15, 44.22

(56) References Cited

U.S. PATENT DOCUMENTS

| | | | | |
|---|---|---|---|---|
| 5,241,528 A | * | 8/1993 | Mohri et al. ................. | 369/219 |
| 5,872,662 A | * | 2/1999 | Lee ............................. | 359/824 |
| 5,881,034 A | | 3/1999 | Mano et al. | |
| 6,175,546 B1 | * | 1/2001 | Liou ........................... | 369/244 |
| 6,341,104 B1 | * | 1/2002 | Yamaguchi et al. ...... | 369/44.15 |
| 6,344,936 B1 | | 2/2002 | Santo et al. | |
| 6,449,229 B1 | * | 9/2002 | Kim et al. .................. | 369/53.19 |
| 6,501,710 B2 | * | 12/2002 | Yokoyama et al. ........ | 369/44.14 |
| 6,721,110 B2 | * | 4/2004 | Song et al. .................. | 359/814 |
| 2001/0021164 A1 | | 9/2001 | Fujii et al. | |
| 2002/0150002 A1 | * | 10/2002 | Pae et al. ................. | 369/44.16 |

FOREIGN PATENT DOCUMENTS

| | | |
|---|---|---|
| JP | 10-64071 | 3/1998 |
| JP | 11-283258 | 10/1999 |
| JP | 11-312327 | 11/1999 |
| JP | 2000-20983 | 1/2000 |
| JP | 2000-222752 | 8/2000 |
| JP | 2000-276748 | 10/2000 |
| JP | 2001-167458 | 6/2001 |
| JP | 2001-325739 | 11/2001 |
| JP | 2001-331956 | 11/2001 |

* cited by examiner

*Primary Examiner*—Ricky Mack
*Assistant Examiner*—Brandi N Thomas
(74) *Attorney, Agent, or Firm*—Stein, McEwen & Bui, LLP

(57) ABSTRACT

An apparatus to drive a blade on which an objective lens is mounted including a first electromagnetic unit to generate a first electromagnetic force and a second electromagnetic unit to generate a second electromagnetic force such that when the first and second magnitudes are the same, the blade is driven in a focus direction, and when the magnitudes are different, the blade is driven in a tilt direction. Accordingly, a tilt error can be actively controlled so that a laser beam is incident on a disk in a precise direction therefore improving the qualities of recording and reproducing data. In addition, tilt control is performed by using a focus adjustment mechanism so that an additional mechanism to control tilt is not required. As a result, the size and weight of the apparatus to drive the objective lens of the optical pickup are reduced.

10 Claims, 8 Drawing Sheets

APPARATUS TO DRIVE OBJECTIVE LENS OF AN OPTICAL PICKUP

CROSS-REFERENCE TO RELATED APPLICATIONS

This application claims the benefit of Korean Application No. 2002-23944, filed May 1, 2002, in the Korean Intellectual Property Office, the disclosure of which is incorporated herein by reference.

BACKGROUND OF THE INVENTION

1. Field of the Invention

The present invention relates to an apparatus to drive an objective lens of an optical pickup, and more particularly, to an apparatus to drive an objective lens of an optical pickup to actively control tilt between the optical pickup and the recording surface of a disk.

2. Description of the Related Art

Disk drives record and read information on and from a disk as a recording medium by irradiating a laser beam onto the disk. Generally, a disk drive includes a turntable on which a disk is mounted, a spindle motor to rotate the turntable, and an optical pickup to irradiate a laser beam onto the recording surface of the disk to record and/or reproduce information on/from the disk.

Here, in order to form a precisely focused optical spot, a laser beam output from an optical pickup has to be orthogonal to the recording surface of a disk. If the laser beam deviates from the orthogonal direction, a precise optical spot cannot be formed on the disk so that errors occur in recording and/or reproducing data on/from the disk. Accordingly, in order to precisely form an optical spot on a selected track of a disk, a laser beam has to be orthogonal to the recording surface of the disk. Here, a process of adjusting a laser beam to be orthogonal to the recording surface of a disk is referred to as a tilt adjustment or a skew adjustment. In general, an optical pickup includes an apparatus to drive an objective lens to control the location of the objective lens in a focus direction and a tracking direction, so as to focus a laser beam on a selected track of the recording surface of a disk. However, although such an apparatus controls a distance between the objective lens and the recording surface of the disk so that the focus of an optical spot is maintained and the optical spot traces a selected track, the apparatus cannot directly control the recording surface of the disk and the incident angle of the laser beam. Accordingly, a tilt adjustment mechanism has been required to more precisely record and/or reproduce information.

A conventional apparatus to drive an objective lens of an optical pickup having an active tilt adjustment mechanism as illustrated in FIGS. 1 and 2, has been provided. An optical pickup includes an apparatus to drive an objective lens, and has a focus and tracking adjustment mechanism to drive a blade 2 on which an objective lens 1 is mounted in a focus direction A and a tracking direction B, and a tilt adjustment mechanism to drive the blade 2 in a tilt direction C.

Here, the focus and tracking adjustment mechanism has a general structure including a focus coil 3, tracking coils 4, and a magnet 8. Consequently, currents flowing through the focus coil 3 and the tracking coils 4 are controlled to generate an electromagnetic force to drive the blade 2 in a corresponding direction. Reference numeral 5 denotes wires that support and allow the blade 2 to move toward a holder 6.

The tilt adjustment mechanism is formed of iron cores 17a and 17b inserted into bosses 16a and 16b on a base 10, tilt coils 15a and 15b winding around the bosses 16a and 16b, and tilt magnets 14a and 14b installed on the blade 2 to be opposite to the iron cores 17a and 17b. Therefore, the iron cores 17a and 17b are magnetized according to the direction of the currents flowing through the tilt coils 15a and 15b. Thereafter, a magnetic field between the magnetized iron cores 17a and 17b and the tilt magnets 14a and 14b drives the blade 2 in the tilt direction C.

In such an arrangement, since the tilt adjustment mechanism has to be installed in addition to the focus and tracking adjustment mechanism, the number of components increases. In addition, since the tilt magnets 14a and 14b are installed on the blade 2 as a driving portion, the weight of the driving portion increases so that the response speed or the driving portion is deteriorated.

As a result, a new structure of actively adjusting a tilt between a disk and an optical pickup by using a simple configuration is required.

SUMMARY OF THE INVENTION

Accordingly, it is an objective of the present invention to provide a tilt adjustment apparatus of an optical pickup to actively control tilt while not increasing the number of components and the weight of a driving portion.

Additional objects and advantages of the invention will be set forth in part in the description which follows and, in part, will be obvious from the description, or may be learned by practice of the invention.

The foregoing and other objects of the present invention are achieved by providing an apparatus to drive an objective lens of an optical pickup including a focus mechanism to drive a blade on which an objective lens is mounted in a focus direction against a base and a tracking mechanism to drive the blade in a tracking direction. Here, the focus mechanism has a first electromagnetic unit to generate a first electromagnetic force and a second electromagnetic unit to generate a second electromagnetic force to drive the blade in a focus direction when the magnitudes of the first and second electromagnetic forces generated by the first and second electromagnetic units are the same and to drive the blade in a tilt direction when the magnitudes of the first and second electromagnetic forces are different.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
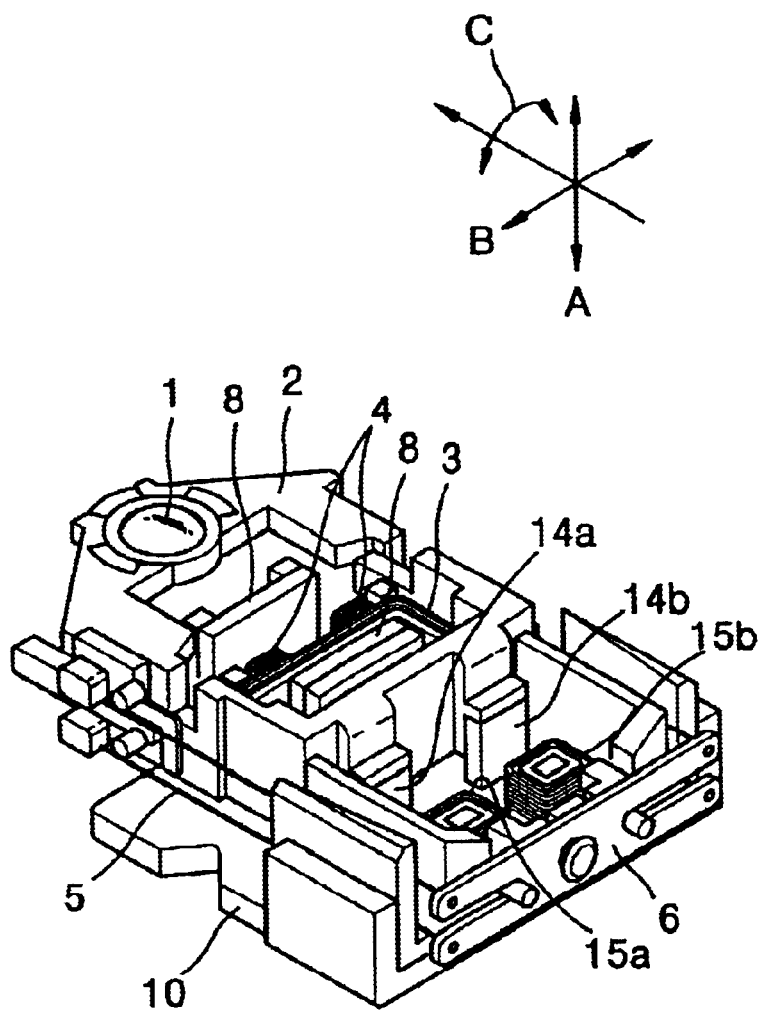
FIG. 1 is a perspective view of a conventional apparatus to drive the objective lens.
Figure 2:
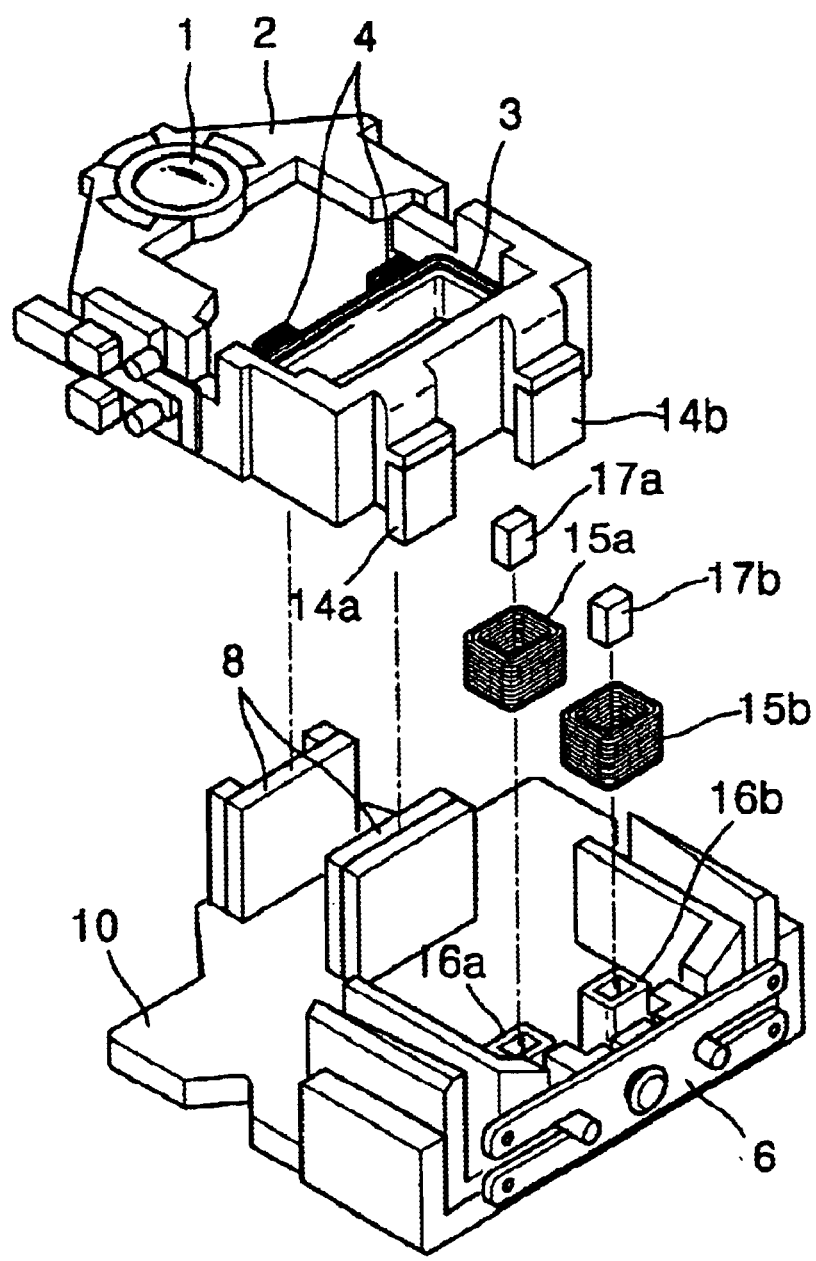
FIG. 2 is an exploded perspective view of the apparatus to drive the objective lens of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
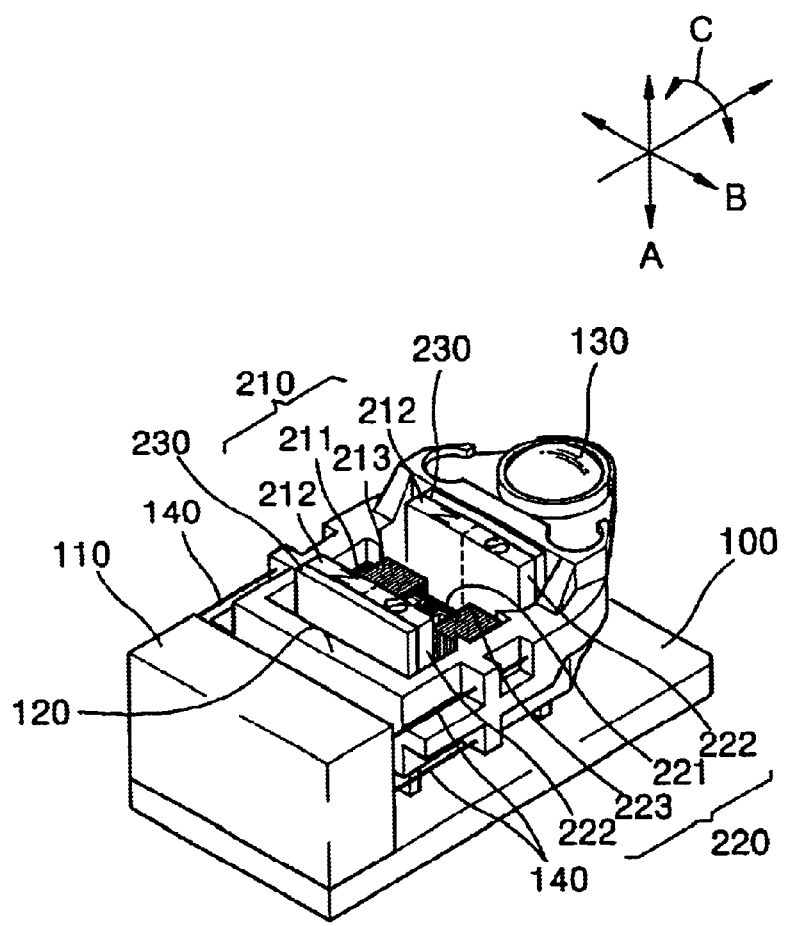
FIG. 3 is a perspective view of an apparatus to drive an objective lens according to an embodiment of the present invention.
Figure 4:
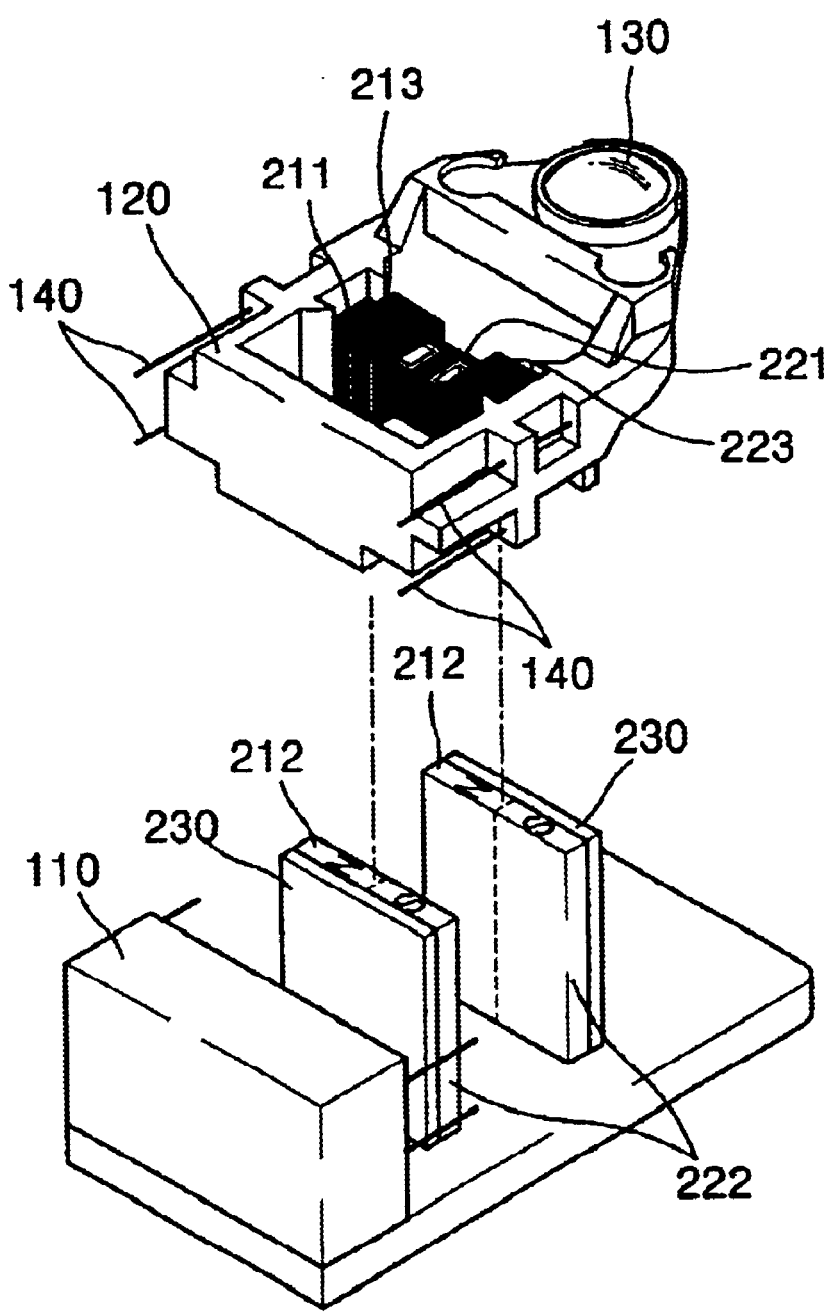
FIG. 4 is an exploded perspective view of the apparatus to drive the objective lens of FIG. 3.

FIGS. 3 and 4 illustrate an apparatus to drive an objective lens of an optical pickup according to an embodiment of the present invention.

Referring to FIGS. 3 and 4, a holder 110 is arranged on a base 100, and a plurality of wires 140 support and allow a blade 120, on which an objective lens 130 is mounted to move with respect to the holder 110. In addition, a focus mechanism to drive the objective lens 130 in a focus direction A and a tracking mechanism to drive the objective lens 130 in a tracking direction B are arranged in the apparatus.

The focus mechanism is formed of a first electromagnetic unit 210 and a second electromagnetic unit 220 that are adjacent to each other. Here, the first electromagnetic unit 210 includes a first focus coil 211 installed on the blade 120 and a couple of first magnets 212 installed on the base 100, and generates a first electromagnetic force by the mutual operation of the current flowing through the first focus coil 211 and the magnetic field lines of the couple of first magnets 212. The second electromagnetic unit 220 includes a second focus coil 221 installed on the blade 120 and a couple of second magnets 222 installed on the base 100, and generates a second electromagnetic force by the mutual operation of the current flowing through the second focus coil 221 and the magnetic field lines of the couple of second magnets 222. In another embodiment of the present invention, separate magnets may be used for the first and second magnets 212 and 222; however, integral type polarization magnets, which are polarized into two magnetic poles, are used for the first and second magnets 212 and 222 in this embodiment the present invention. Accordingly, a couple of integral type polarization magnets are arranged with the first and second focus coils 211 and 221 therebetween, while the first pair of first and second magnets 212 and 222 face the second pair of first and second magnets 212 and 222, respectively. Therefore, the magnetic field lines of the couple of first magnets 212 are formed toward the first focus coil 211 in the first electromagnetic unit 210, while the magnetic field lines of the couple of second magnets 222 are formed to be distant from the second focus coil 221 in the second electromagnetic unit 220.

The tracking mechanism includes tracking coils 213 and 223 winding around the first and second focus coils 211 and 221. Thus, an electromagnetic force generated by the current flowing through the tracking coils 213 and 223 and the magnetic field lines of the couple of first and second magnets 212 and 222 drives the blade 120 in a tracking direction B. Here, reference numeral 230 denotes yokes.

Figure 5:
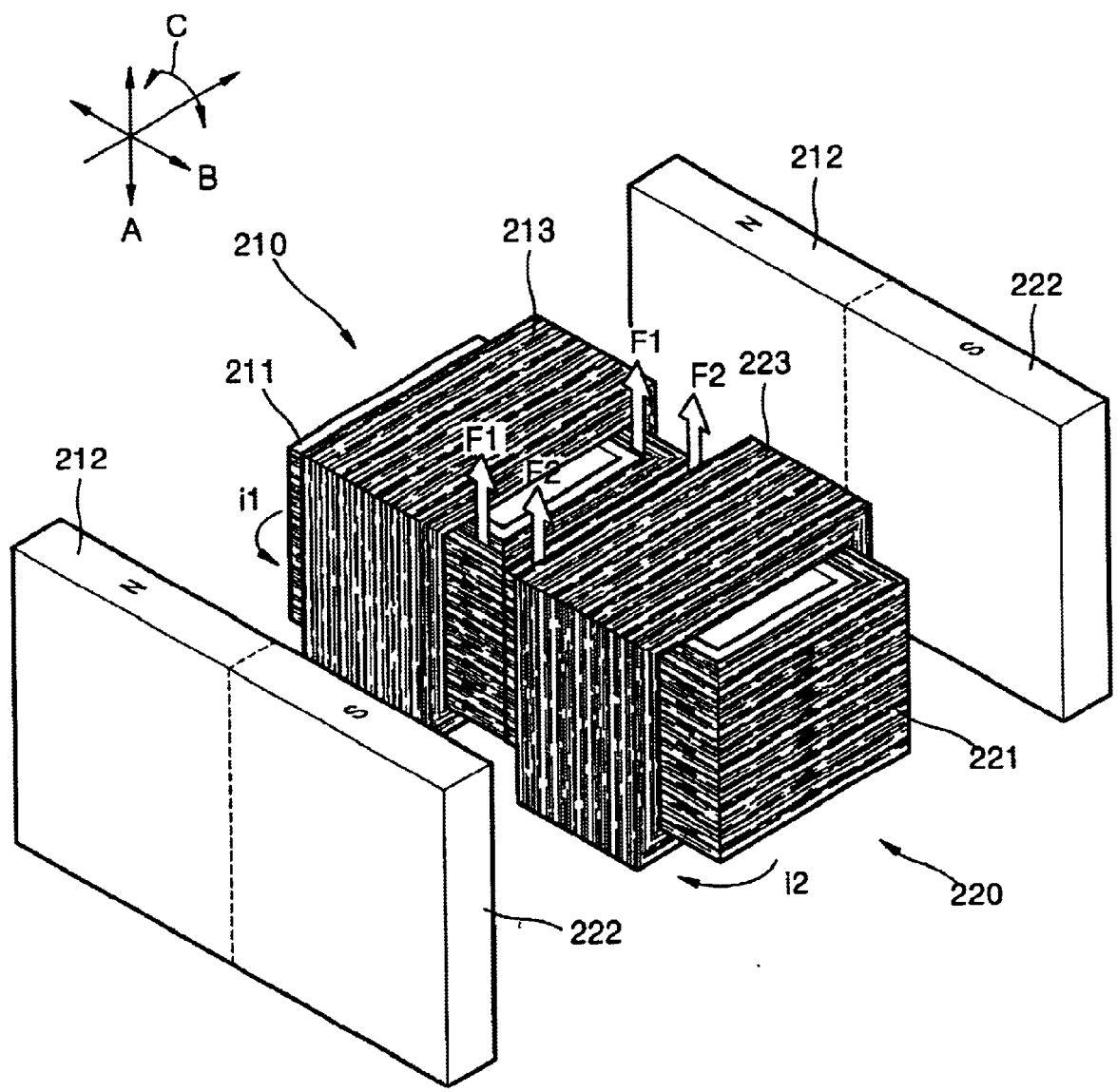
FIG. 5 is a view illustrating the operation of the apparatus to drive the objective lens of FIG. 3 in a focus direction.

When currents having the same intensity respectively flow through the first and second focus coils 211 and 221, i.e., i1 equals i2, in directions represented in FIG. 5, first and second electromagnetic forces F1 and F2 of the first and second electromagnetic units 210 and 220 are respectively generated in the focus direction A with the same strength. Therefore, in order to control the focus, currents having the same intensity are applied to the first and second focus coils 211 and 221 so that the electromagnetic forces generated from the first and second electromagnetic units 210 and 220 balance and elevate the blade 120 (refer to FIG. 3). When high intensity currents are applied to the first and second focus coils 211 and 221, respectively, the elevated distance of the blade 120 is large, and when the intensity of the currents decreases, the blade 120 is lowered.

Figure 6:
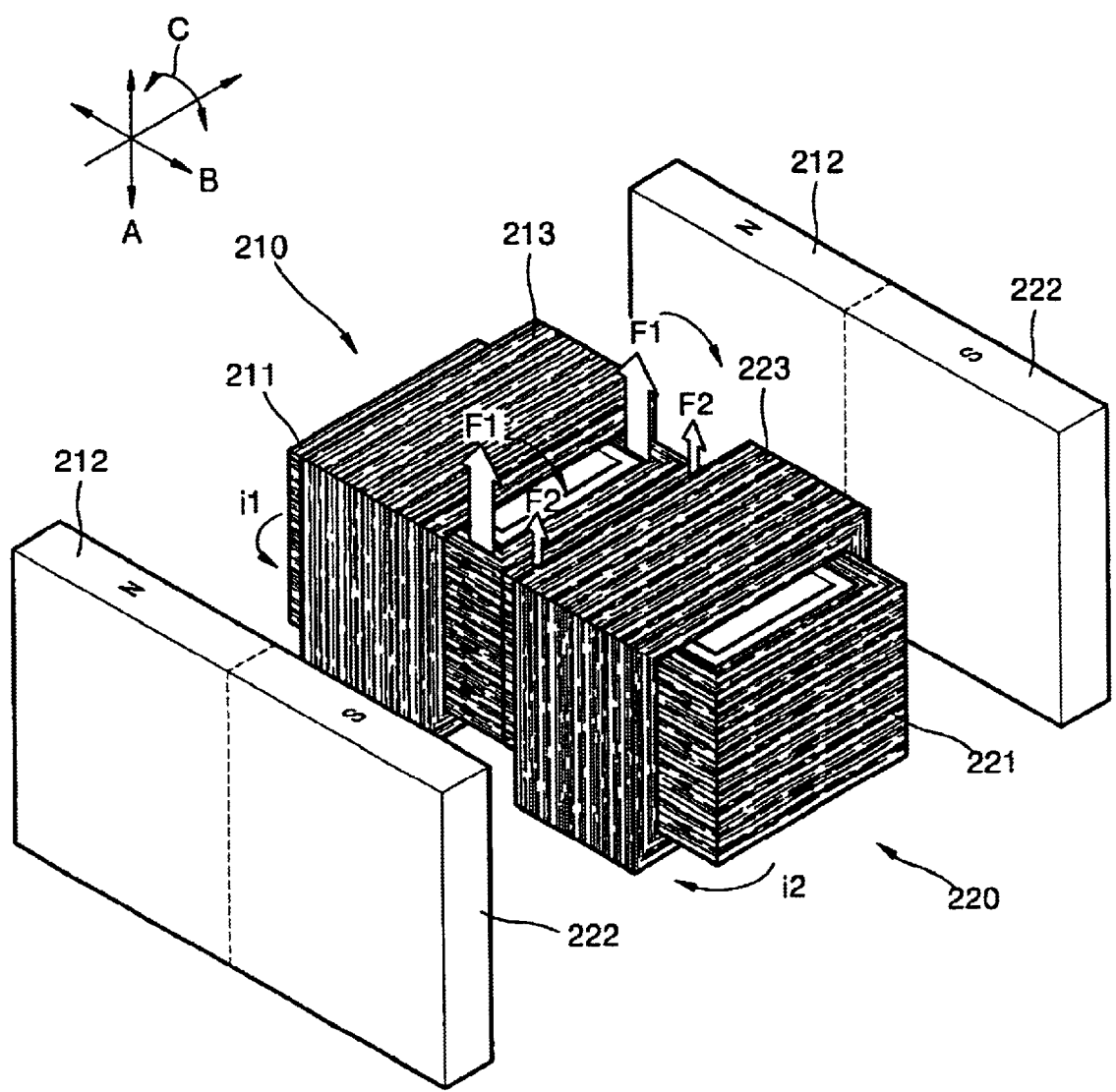
FIG. 6 is a view illustrating the operation of the apparatus to drive the objective lens of FIG. 3 in a tilt direction.

In order to control the tilt, currents having different intensities are applied to the first and second focus coils 211 and 221, as illustrated in FIG. 6. In other words, currents having the same intensity are supplied to the first and second focus coils 211 and 221, respectively, in a focus adjustment process, and currents having different intensities are supplied to the first and second focus coils 211 and 221 in a tilt adjustment process. Consequently, the first and second electromagnetic units 210 and 220 generate first and second electromagnetic forces F1 and F2 having different magnitudes, so that a moment is applied to the blade 120 (refer to FIG. 3). FIG. 6 illustrates a case where a current i1 flowing through the first focus coil 211 is larger than a current i2 flowing through the second focus coil 221. In this case, the first electromagnetic force F2 becomes larger than the second electromagnetic force F2 so that a moment is applied in a clockwise direction. As a result, the blade 120 is rotated in a tilt direction C to control the tilt by adjusting a difference between currents supplied to the first and second focus coils 211 and 221.

Figure 7:
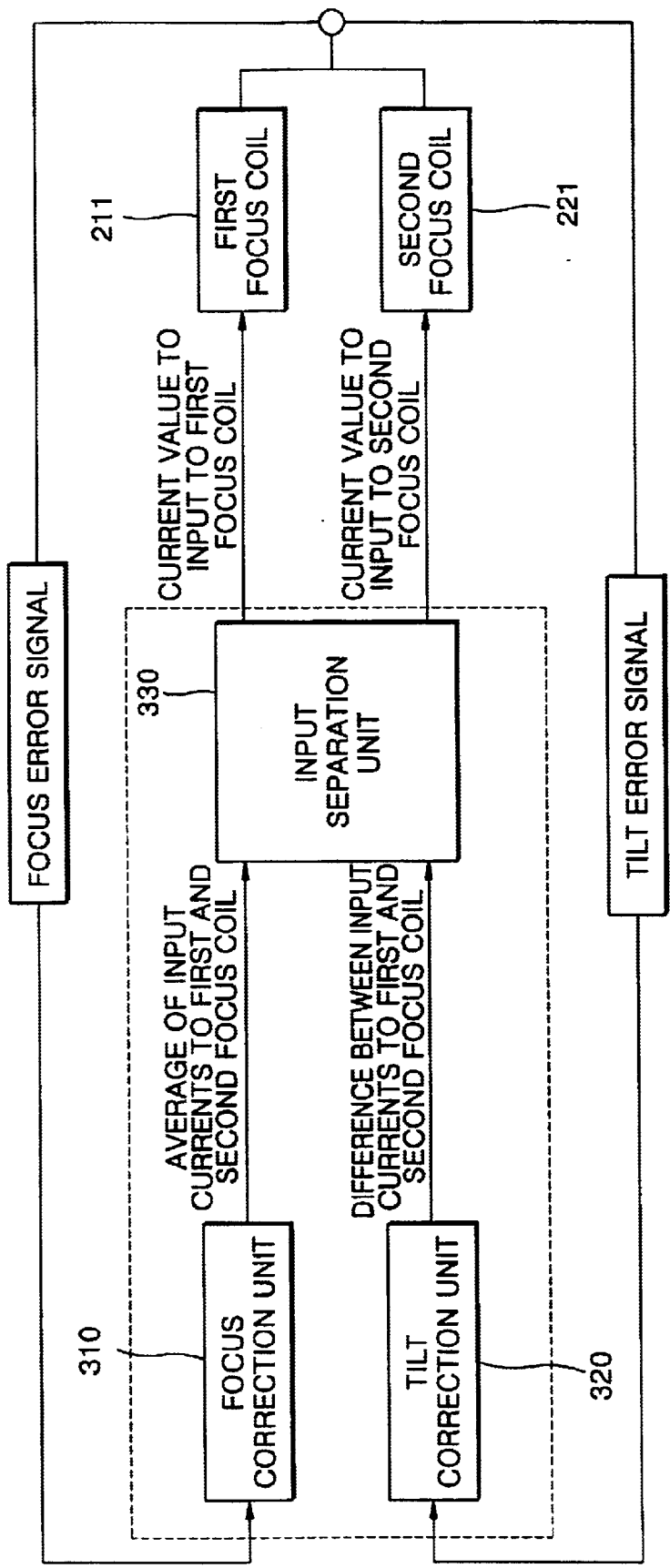
FIG. 7 is a block diagram of a control circuit to control the apparatus to drive the objective lens of FIG. 3.

The constitution of a control circuit to control focus and tilt by adjusting the intensities of currents flowing through first and second focus coils 211 and 221 is schematically illustrated in FIG. 7. When a focus error signal is input from a predetermined error detection unit (not shown), a focus correction unit 310 calculates the intensities of currents to be supplied to the first and second focus coils 211 and 221 to correct the error. An input separation unit 330 supplies corresponding currents to the first and second focus coils 211 and 221, respectively, to elevate the blade 120 (refer to FIG. 3). In such a manner, when a tilt error signal is input, a tilt correction unit 320 calculates the intensities of currents to be supplied to the first and second focus coils 211 and 221 to correct the error. The input separation unit 330 supplies corresponding currents to the first and second focus coils 211 and 221, respectively, to rotate the blade 120. As a result, by controlling the intensities of currents supplied to the first and second focus coils 211 and 221, the focus and the tilt can be controlled.

Figure 8:
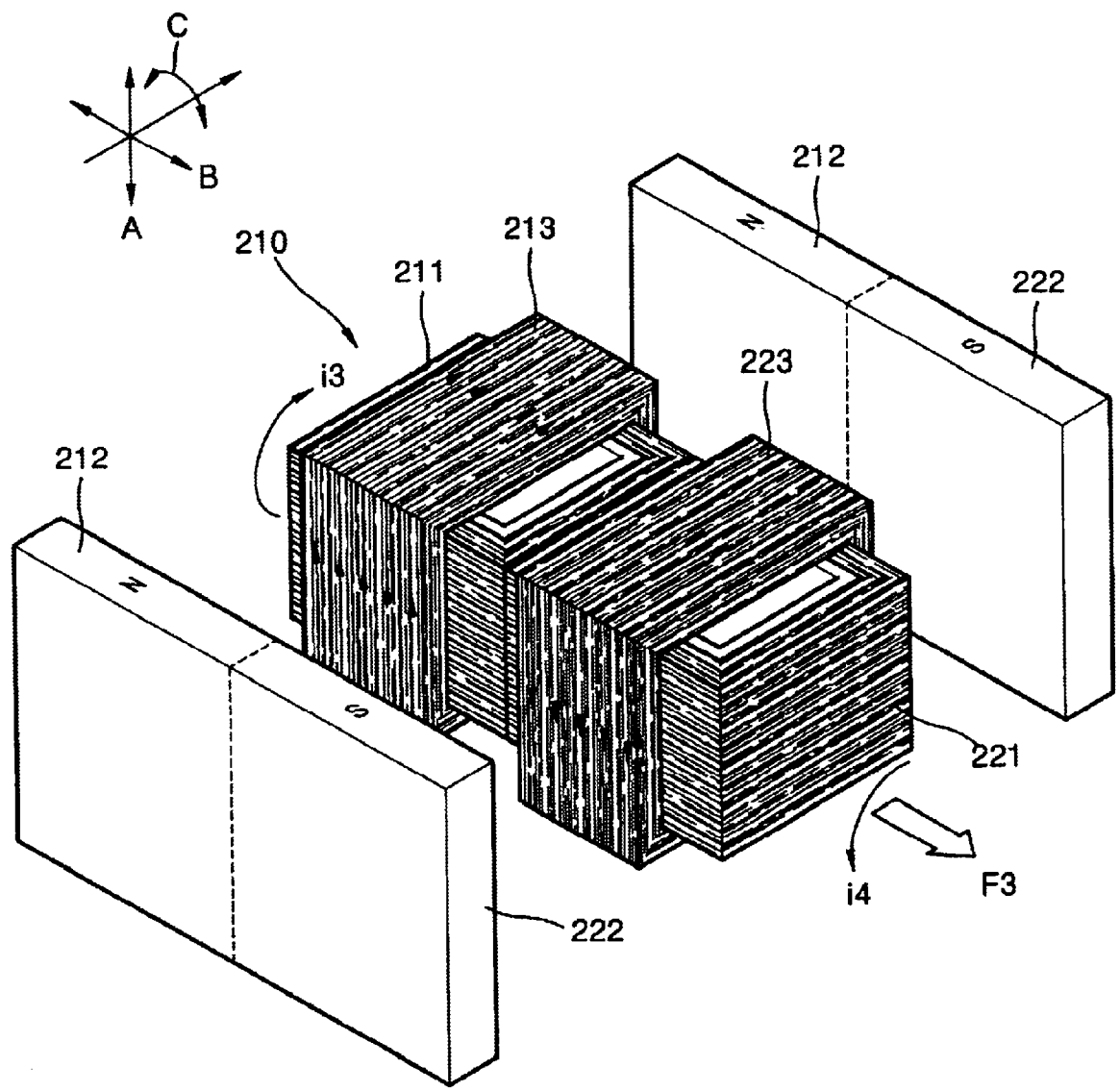
FIG. 8 is a view illustrating the operation of the apparatus to drive the objective lens of FIG. 3 in a tracking direction.

Meanwhile, tracking is controlled by using an electromagnetic force generated by the currents flowing through the tracking coils 213 and 223 and the operation between the couple of first and second magnets 212 and 222. Referring to FIG. 8, when currents i3 and i4 flow through the tracking coils 213 and 223, an electromagnetic force F3 is generated in the arrow direction by the operation between the couple of first and second magnets 212 and 222. If the currents flow in an opposite direction, the electromagnetic force is generated in the opposite direction. Consequently, the electromagnetic force drives the blade 120 to control tracking.

As a result, an apparatus to drive an objective lens according to the embodiments of the present invention has first and second focus coils 211 and 221 and tracking coils 213 and 223 installed between a first and second couple of magnets 212 and 222. In addition, the apparatus according to the embodiments of the present invention controls tilt as well as focus and tracking by adjusting the intensities of currents flowing through the focus and tracking coils 211, 221, 213, and 223.

In order to improve the response speed of the apparatus, it is preferable that the first and second focus coils 211 and 221 and tracking coils 213 and 223 are located at the center of the blade 120. It is preferable that yokes are added at the first and second focus coils 211 and 221, respectively, to improve the generated electromagnetic forces.

The apparatus to drive an objective lens of an optical pickup may actively control tilt between a disk and the optical pickup to emit a laser beam onto the disk in a precise orthogonal direction to the disk so as to improve recording and reproducing quality. In addition, the apparatus to drive an objective lens according to the present invention controls tilt by using a focus adjustment mechanism so as to reduce the size and weight of the apparatus due to not additionally installing a tilt adjustment mechanism.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to drive an objective lens of an optical pickup including a focus mechanism to drive a blade on which an objective lens is mounted in a focus direction against a base and a tracking mechanism to drive the blade in a tracking direction, the focus mechanism comprising:

a first electromagnetic unit to generate a first electromagnetic force; and a second electromagnetic unit to generate a second electromagnetic force, wherein the first and second electromagnetic forces drive the blade in a focus direction when the magnitudes of the first and second electromagnetic forces generated by the first and second electromagnetic units are the same, and drive the blade in a tilt direction when the magnitudes of the first and second electromagnetic forces are different.

2. The apparatus to drive the objective lens of the optical pickup of claim 1, wherein:

the first electromagnetic unit comprises:

a first focus coil installed on the blade, and a couple of first magnets installed on the base to be opposite to each other with the first focus coil therebetween; and the second electromagnetic unit comprises:

a second focus coil installed on the blade; and a couple of second magnets installed on the base to be opposite to each other with the second focus coil therebetween.

3. The apparatus to drive the objective lens of the optical pickup of claim 2, wherein the couple of first magnets are integrally formed polarization magnets having two magnetic poles and the couple of second magnets are integrally formed polarization magnets having two magnetic poles.

4. The apparatus to drive the objective lens of the optical pickup of claim 2, wherein the tracking mechanism comprises:

a first tracking coil surrounding the first focus coil; and a second tracking coil surrounding the second focus coil, wherein a driving force in a tracking direction is generated by the mutual operation between the first and second tracking coils and the first and second magnets.

5. The apparatus to drive the objective lens of the optical pickup of claim 2, wherein the couple of first and couple of second magnets are each separate polarization magnets.

6. The apparatus to drive the objective lens of the optical pickup of claim 2, wherein the first and second focusing coils and the tracking coils are located at the center of the blade.

7. An optical pickup having an objective lens comprising:

first and second focusing coils; and first and second tracking coils;

wherein the focusing coils are used for both focusing and tilting adjustments of the optical pickup.

8. The optical pickup of claim 7, further comprising:

a focusing adjustment unit and a tilting adjustment unit integrally formed as one unit.

9. A control circuit to control an optical pickup having first and second focusing coils and first and second tracking coils, comprising:

a focus correction unit to calculate the intensities of currents to be supplied to the focusing coils based upon a detected focusing error signal;

a tilt error correction unit to calculate the intensities of currents to be supplied to the focusing coils based upon a detected tilt error signal; and an input separation unit to supply the current intensities calculated by the focus correction unit and the tilt correction unit to the focusing coils to control focus and tilt of the optical pickup.

10. The control circuit of claim 6, wherein the current flowing through the first and second tracking coils generates an electromagnetic force to control tracking of the optical pickup unit.

* * * * *

UNITED STATES PATENT AND TRADEMARK OFFICE
CERTIFICATE OF CORRECTION

PATENT NO.    : 6,917,480 B2
DATED         : July 12, 2005
INVENTOR(S)   : Young-min Cheong et al.

It is certified that error appears in the above-identified patent and that said Letters Patent is hereby corrected as shown below:

<u>Column 5,</u>
Line 33, insert -- primarily -- after "blade".

Signed and Sealed this

Eighteenth Day of October, 2005

JON W. DUDAS
*Director of the United States Patent and Trademark Office*